(12) United States Patent
Ohira

(10) Patent No.: US 8,189,946 B2
(45) Date of Patent: May 29, 2012

(54) IMAGE PROCESSING APPARATUS AND METHOD THEREOF FOR DETECTING AND REMOVING NOISE IN DECODED IMAGES

(75) Inventor: Tadashi Ohira, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1176 days.

(21) Appl. No.: 11/972,442

(22) Filed: Jan. 10, 2008

(65) Prior Publication Data

US 2008/0175512 A1    Jul. 24, 2008

(30) Foreign Application Priority Data

Jan. 24, 2007 (JP) ................................. 2007-014199
Jan. 24, 2007 (JP) ................................. 2007-014200

(51) Int. Cl.
  *G06K 9/40* (2006.01)
  *H04N 5/00* (2011.01)
(52) U.S. Cl. ........ 382/266; 382/261; 382/268; 348/607; 348/625
(58) Field of Classification Search .................. 382/199, 382/232, 234, 238, 254, 266, 268; 375/240.29, 375/240.24, 240.22; 348/420.1, 699, 700, 348/606, 625, 607
See application file for complete search history.

(56) References Cited

U.S. PATENT DOCUMENTS

| 7,251,276 | B2* | 7/2007 | Lee et al. ................. 375/240.03 |
| 7,657,098 | B2* | 2/2010 | Lin et al. ....................... 382/199 |
| 7,715,647 | B2* | 5/2010 | Kajihata ....................... 382/268 |
| 7,738,563 | B2* | 6/2010 | Pelc et al. ................ 375/240.29 |
| 7,738,564 | B2* | 6/2010 | Park et al. ................ 375/240.29 |
| 7,738,722 | B2* | 6/2010 | Gomila et al. ................ 382/254 |
| 7,760,964 | B2* | 7/2010 | Wang ............................. 382/275 |
| 7,778,480 | B2* | 8/2010 | Huang et al. .................. 382/268 |
| 7,885,341 | B2* | 2/2011 | Chen et al. ............... 375/240.29 |
| 2006/0008013 | A1* | 1/2006 | Pelc et al. ................ 375/240.29 |
| 2006/0245506 | A1* | 11/2006 | Lin et al. ................. 375/240.29 |
| 2007/0263897 | A1* | 11/2007 | Ong et al. ..................... 382/100 |

FOREIGN PATENT DOCUMENTS

JP    10-013718    1/1998

OTHER PUBLICATIONS

Hiroshi Harashima et. al., "εseparating nonlinear digital filter and its application", The Institute of Electronics, Information and Communication Engineers, Sho57-Ron146 [A-36], Apr. 1982.

* cited by examiner

*Primary Examiner* — Andrae S Allison
(74) *Attorney, Agent, or Firm* — Cowan, Liebowitz & Latman, P.C.

(57) ABSTRACT

The intensities of horizontal and vertical edges of each block of luminance signals of an image are measured, and horizontal and vertical edge intensity data of respective blocks are stored for one frame in an edge intensity mapping memory. A noise removal flag used to specify a filtering block is calculated based on the edge intensity data, and is stored in a noise removal flag mapping memory. A filter controller controls whether or not to apply filtering processing to each block, specified by this noise removal flag, of the current frame of the image based on the horizontal and vertical edge intensity data of that block of the current frame and those of the corresponding block of the immediately preceding frame.

8 Claims, 16 Drawing Sheets

1 FRAME

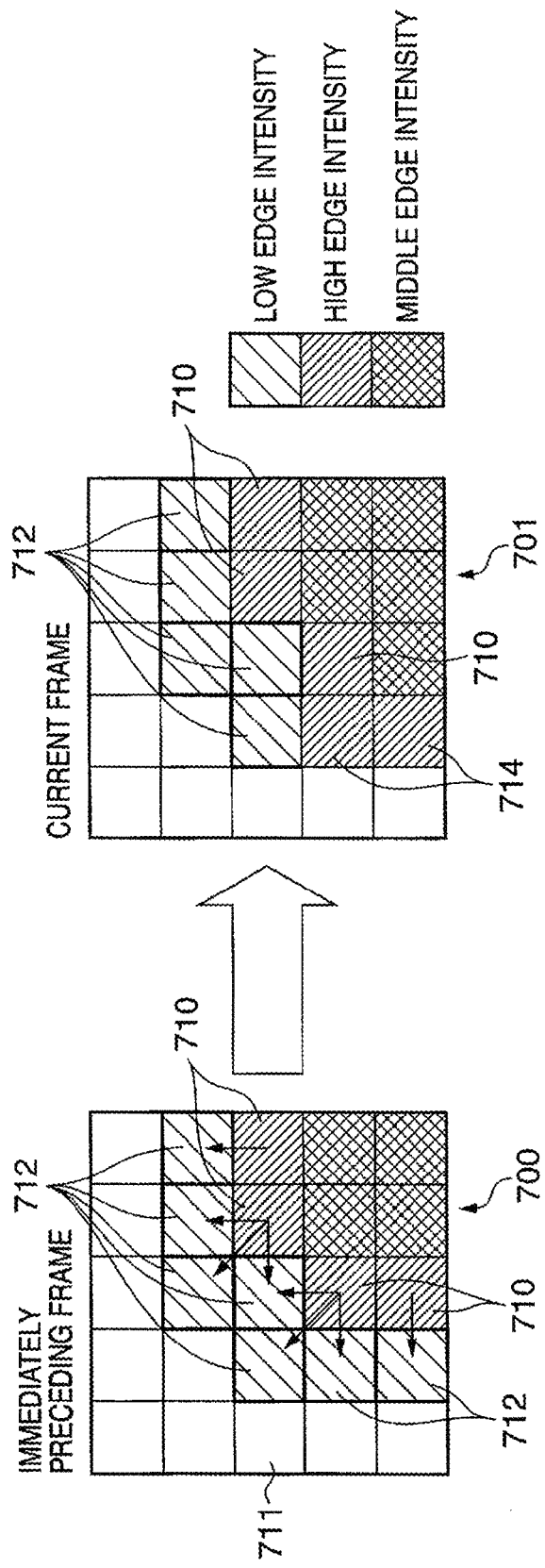

FIG. 8A

| -1 | 0 | 1 |
|---|---|---|
| -2 | 0 | 2 |
| -1 | 0 | 1 |

HORIZONTAL SOBEL FILTER

FIG. 8B

| 1 | 2 | 1 |
|---|---|---|
| 0 | 0 | 0 |
| -1 | -2 | -1 |

VERTICAL SOBEL FILTER

FIG. 9A

| 1/3 | 1/3 | 1/3 |
|---|---|---|

HORIZONTAL SMOOTHING FILTER

FIG. 9B

| 1/9 | 1/9 | 1/9 |
|---|---|---|
| 1/9 | 1/9 | 1/9 |
| 1/9 | 1/9 | 1/9 |

2D SMOOTHING FILTER

FIG. 13

$$g(x,y) = f(x,y) - \frac{1}{(2M+1)^2} \sum_{i=-M}^{M} \sum_{j=-M}^{M} F(f(x,y) - f(x+i, y+j))$$

$$F(x) = \begin{cases} x & (-\varepsilon_0 \leq x \leq \varepsilon_0) \\ 0 & (x < -\varepsilon_0, x > \varepsilon_0) \end{cases}$$

IMAGE PROCESSING APPARATUS AND METHOD THEREOF FOR DETECTING AND REMOVING NOISE IN DECODED IMAGES

BACKGROUND OF THE INVENTION

1. Field of the Invention

The present invention relates to an image processing apparatus and method thereof, which detect a noise containing part of an image obtained by decoding image data which has undergone frequency transformation and lossy compression coding by, e.g., an MPEG (Moving Picture Experts Group) scheme or the like, and remove that noise part.

2. Description of the Related Art

Conventionally, as image coding schemes, Motion JPEG, Digital Video, and the like as intraframe coding schemes, H.261, H.263, MPEG-1, and MPEG-2 using interframe predicting coding are available. In recent years, a coding scheme such as H.264 or the like is known. These coding schemes are internationally standardized by ISO (International Organization for Standardization) and ITU (International Telecommunication Union).

MPEG-2 as a representative coding scheme is called lossy coding, and decoded data of encoded image data does not become the same as original image data. This is caused by quantization executed after DCT conversion upon coding. These coding schemes reduce the information size by removing redundancy included in an image signal by using the statistical nature of the image signal. That is, since human vision is insensitive to high-frequency components of an image, these high-frequency components are coarsely quantized to remove redundancy, thus obtaining high coding efficiency.

However, since lossy coding that executes DCT conversion of this type compresses data by limiting high-frequency components, noise called mosquito noise is generated at an edge part of an image or around a moving object, thus causing image quality deterioration of the decoded image. Methods of reducing mosquito noise have been proposed. For example, a method of detecting an edge part of an input image signal and applying filtering processing to the edge part of the image signal using a noise removal filter to obtain an image signal from which mosquito noise is reduced has been proposed. Refer to the international standards of ISO/IEC for detailed contents of MPEG and the like.

As a technique for executing such noise removal, Japanese Patent Laid-Open No. 10-13718 describes a technique for detecting horizontal and vertical edges after detection of a motion vector, and then applying filtering for respective dimensions.

However, in the above related art, since filtering processing for mosquito noise removal is applied to the edge part of an image signal irrespective of the presence/absence of mosquito noise in the image signal, an image deteriorates in a part where no mosquito noise is generated. When an image includes a texture area including fine edges, this area is erroneously determined as an edge, and texture information is deleted, resulting in deterioration of image quality.

These problems are posed since the noise removal processing is applied to the edge part of an image signal without accurately detecting a part where noise such as mosquito noise or the like included in an image obtained by decoding image data that has undergone frequency conversion and lossy coding is generated. Also, these problems are posed since the noise removal processing is applied while considering a texture area including fine edges of an image signal as a noise part.

Furthermore, if processing such as IP conversion for converting an interlaced signal into a progressive signal or the like is to be done after the noise removal processing, the noise of the decoded image must be removed so as not to impose any adverse influence on that processing. In other words, noise must be removed while maintaining interlaced information.

SUMMARY OF THE INVENTION

One aspect of the present invention is to eliminate the above-mentioned conventional problems.

As a characteristic feature of the present invention, a noise containing part included in image data is adequately detected, and noise removal processing can be applied to only the noise containing part while maintaining texture information of the image.

According to an aspect of the present invention, there is provided an image processing apparatus comprising:

a measuring unit configured to acquire edge intensity information by dividing an image into a plurality of blocks and measuring an edge of an image in each block;

a storage unit configured to store the edge intensity information of respective blocks for at least one frame;

a determination unit configured to determine a block to be filtered based on the edge intensity information of the respective blocks stored in the storage unit; and a control unit configured to determine whether or not to apply filtering processing to a first block, which is determined by the determination unit as the block to be filtered, of a current frame of the image based on the edge intensity information of the first block in the current frame acquired by the measuring unit, and edge intensity information of a second block corresponding to the first block in an immediately preceding frame of the current frame, which is stored in the storage unit.

According to an aspect of the present invention, there is provided an image processing apparatus comprising:

a measuring unit configured to acquire edge intensity information by dividing an image into a plurality of blocks and measuring an edge of an image in each block; and a control unit configured to determine whether or not to apply filtering processing to each block of the current frame of the image, based on the edge intensity information of each block of the current frame acquired by the measuring unit, and the edge intensity information of a corresponding block of an immediately preceding frame of the current frame.

According to an aspect of the present invention, there is provided an image processing method comprising the steps of:

acquiring edge intensity information by dividing an image into a plurality of blocks and measuring an edge of an image in each block;

storing, in a memory, the edge intensity information of respective blocks for at least one frame;

determining a block to be filtered based on the edge intensity information of the respective blocks stored in the memory; and determining whether or not to apply filtering processing to a first block, which is determined in the determining step as the block to be filtered, of a current frame of the image, based on the edge intensity information of the first block in the current frame acquired in the acquiring step, and edge intensity information of a second block corresponding to the first block in an immediately preceding frame of the current frame, which is stored in the memory.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view explaining an expansion example of an edge area of an immediately preceding frame, and a practical example until a filtering block of the current frame is determined;

FIGS. 8A and 8B depict views illustrating an example of operators of Sobel filters used in this exemplary embodiment;

FIGS. 9A and 9B depict views illustrating an example of operators of smoothing filters according to this exemplary embodiment;

FIG. 13 depicts a view for explaining ε filter processing according to the second embodiment of the present invention;

DESCRIPTION OF THE EMBODIMENTS

Numerous embodiments of the present invention will now herein be described below in detail with reference to the accompanying drawings. The following embodiments are not intended to limit the claims of the present invention and not all combinations of features described in the embodiments are essential to the solving means of the present invention.

First Embodiment

Figure 1:
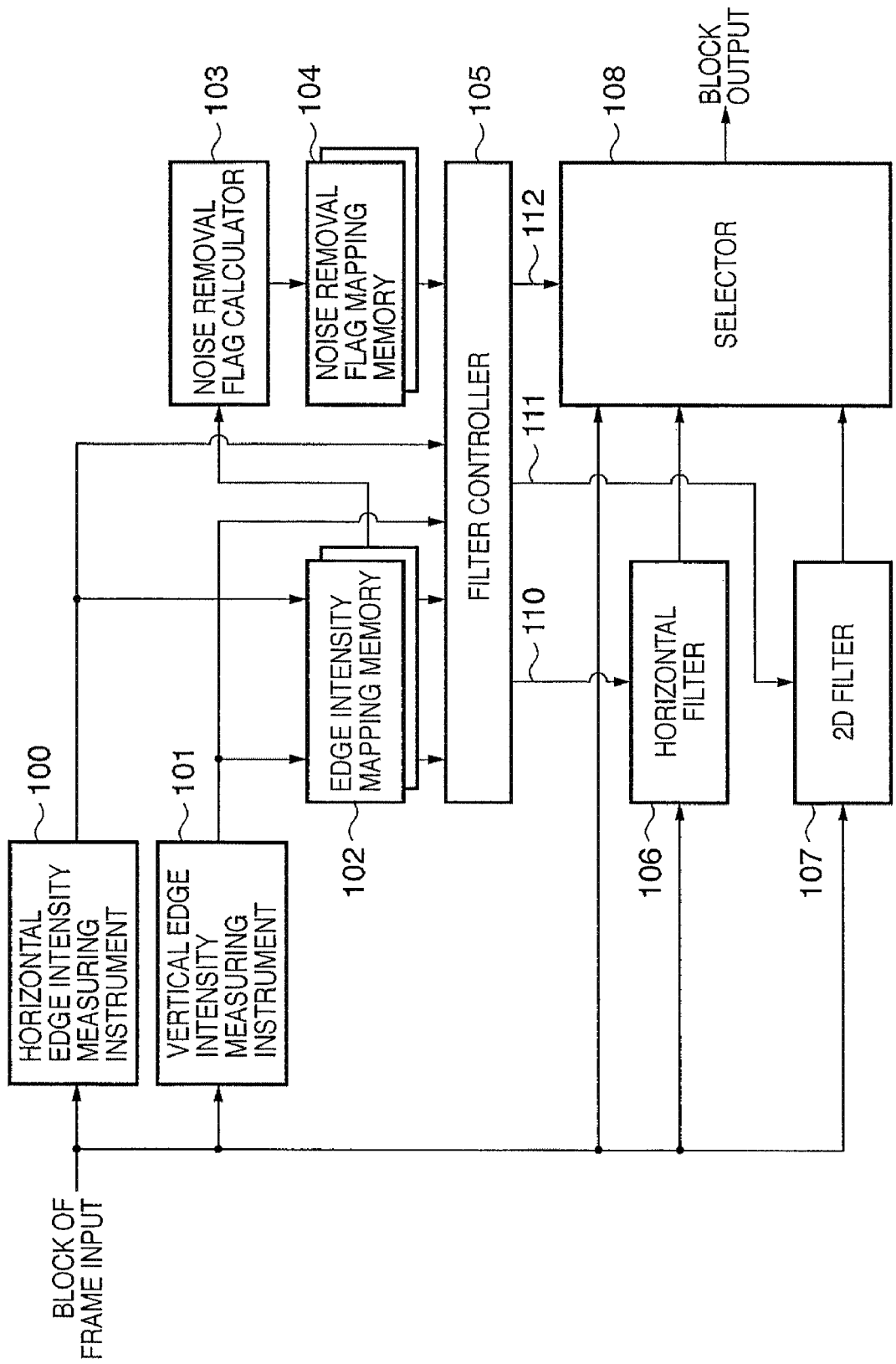
FIG. 1 is a block diagram showing the arrangement of principal part of an image processing apparatus according to a first exemplary embodiment of the present invention.

FIG. 1 is a block diagram showing the arrangement of principal part of an image processing apparatus according to a first exemplary embodiment of the present invention. This embodiment defines a unit of processing of image data as a block of 4×4 pixels, which is called an object block.

Referring to FIG. 1, a horizontal edge intensity measuring instrument 100 receives one block of luminance signals of an image, and measures the horizontal edge intensity of that block. A vertical edge intensity measuring instrument 101 receives one block of luminance signals of that image, and measures the vertical edge intensity of that block. This exemplary embodiment expresses the edge intensity for pixels of the object block as the processing unit by an accumulated value of a Sobel filter.

FIGS. 8A and 8B depict views illustrating an example of operators of Sobel filters used in this embodiment. FIG. 8A shows a 3×3 horizontal Sobel filter used in the horizontal edge intensity measuring instrument 100, and FIG. 8B shows a 3×3 vertical Sobel filter used in the vertical edge intensity measuring instrument 101.

An edge intensity mapping memory (edge intensity storage unit) 102 receives horizontal and vertical edge intensity data measured by the horizontal and vertical edge intensity measuring instruments 100 and 101, and stores the horizontal and vertical edge intensity data of respective blocks for one frame. Note that this edge intensity mapping memory 102 has a 2-bank configuration, so that the edge intensity data of the current frame can be stored in one memory bank while the stored edge intensity data of the immediately preceding frame can be read out from the other memory bank. The memory banks are switched for the processing of each frame. A noise removal flag calculator 103 calculates a flag (noise removal flag) indicating if a block of interest is a block to be filtered (to be referred to as a filtering block hereinafter), based on the edge intensity data for respective blocks stored in the edge intensity mapping memory 102. A noise removal flag mapping memory 104 stores noise removal flags, calculated by the noise removal flag calculator 103, of respective blocks only for one frame. Note that the noise removal flag mapping memory 104 also has a 2-bank configuration, so that the noise removal flags can be stored in one memory bank, while the stored noise removal flags of the immediately preceding frame can be read out from the other memory bank. The memory banks are switched for the processing of each frame.

A filter controller 105 controls filters 106 and 107 and a selector 108 (to be described later) based on the horizontal and vertical edge intensity data for each block of the current frame, and the edge intensity data and the noise removal flag of the corresponding block of the immediately preceding frame. Note that the horizontal and vertical edge intensity data of each block of the current frame are the results measured by the horizontal and vertical edge intensity measuring instruments 100 and 101, respectively. The edge intensity data of each block of the immediately preceding frame are stored in the edge intensity mapping memory 102, and the noise removal flag for each block of the immediately preceding frame is stored in the noise removal flag mapping memory 104. The horizontal filter 106 executes horizontal filtering processing in the frame for respective blocks in response to a control signal 110 from the filter controller 105. The two-dimensional (to be abbreviated as 2D hereinafter) filter 107 executes 2D filtering processing in the frame for respective blocks in response to a control signal 111 from the filter controller 105. Note that this embodiment uses smoothing filters for these horizontal filter 106 and 2D filter 107.

FIGS. 9A and 9B depict views illustrating an example of operators of these smoothing filters.

FIG. 9A shows an example of a horizontal smoothing filter used by the horizontal filter 106, and FIG. 9B shows an example of a 2D smoothing filter used by the 2D filter 107.

The selector 108 selects one of the outputs from the horizontal filter 106 and 2D filter 107 and a non-filtered signal (signal of an input block) in accordance with a selection signal 112 from the filter controller 105, and outputs the selected signal as an image signal for each block.

The operation of the apparatus with the above arrangement will be described below with reference to the flowcharts of FIGS. 2, 3, 5, and 6. Note that the processing is switched for the first frame, and other frames in the first exemplary embodiment.

Figure 2:
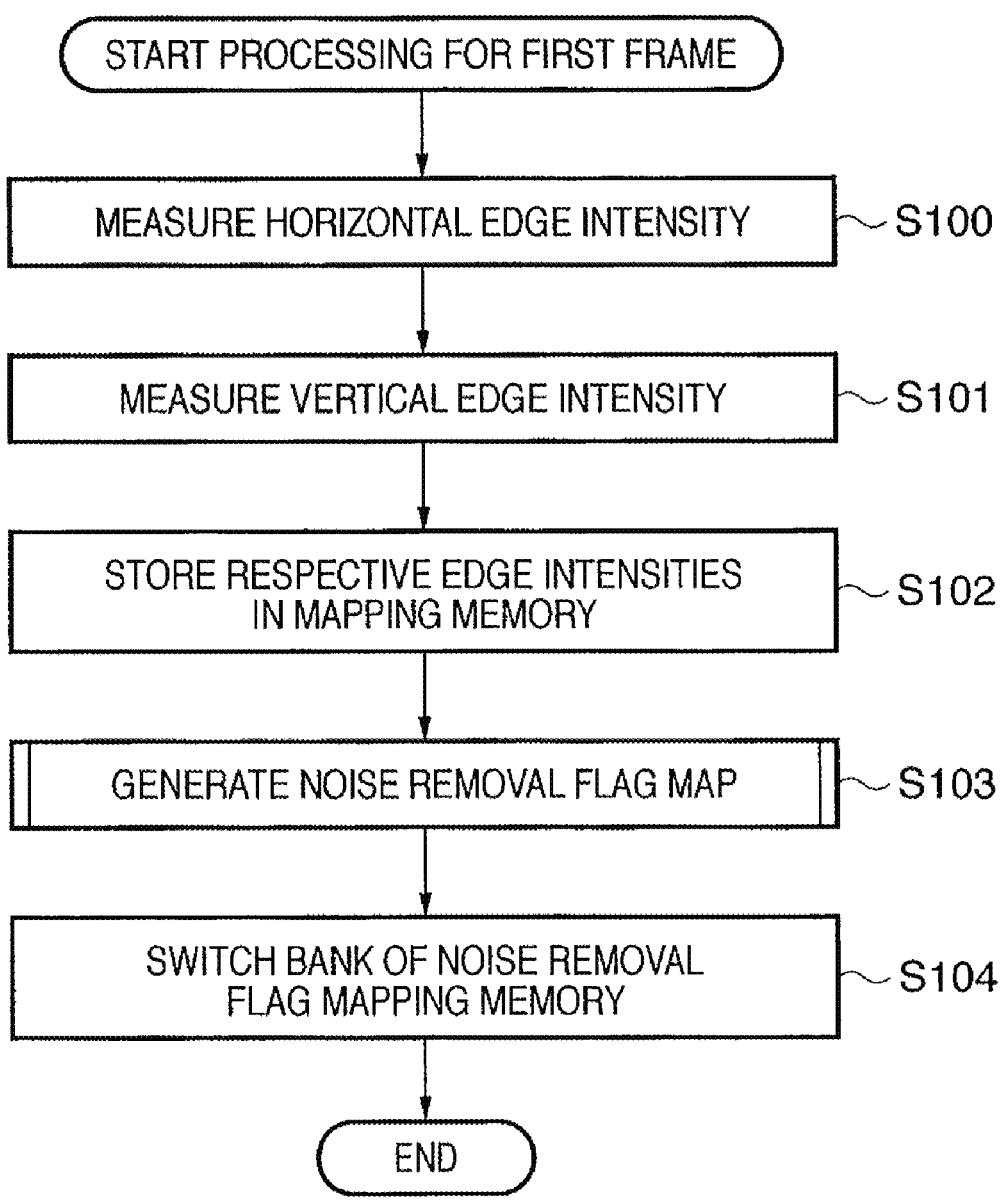
FIG. 2 is a flowchart explaining the processing of a first frame in the image processing apparatus according to the first exemplary embodiment of the present invention.

FIG. 2 is a flowchart explaining the processing for the first frame of an input image in the image processing apparatus according to the exemplary embodiment.

Figure 3:
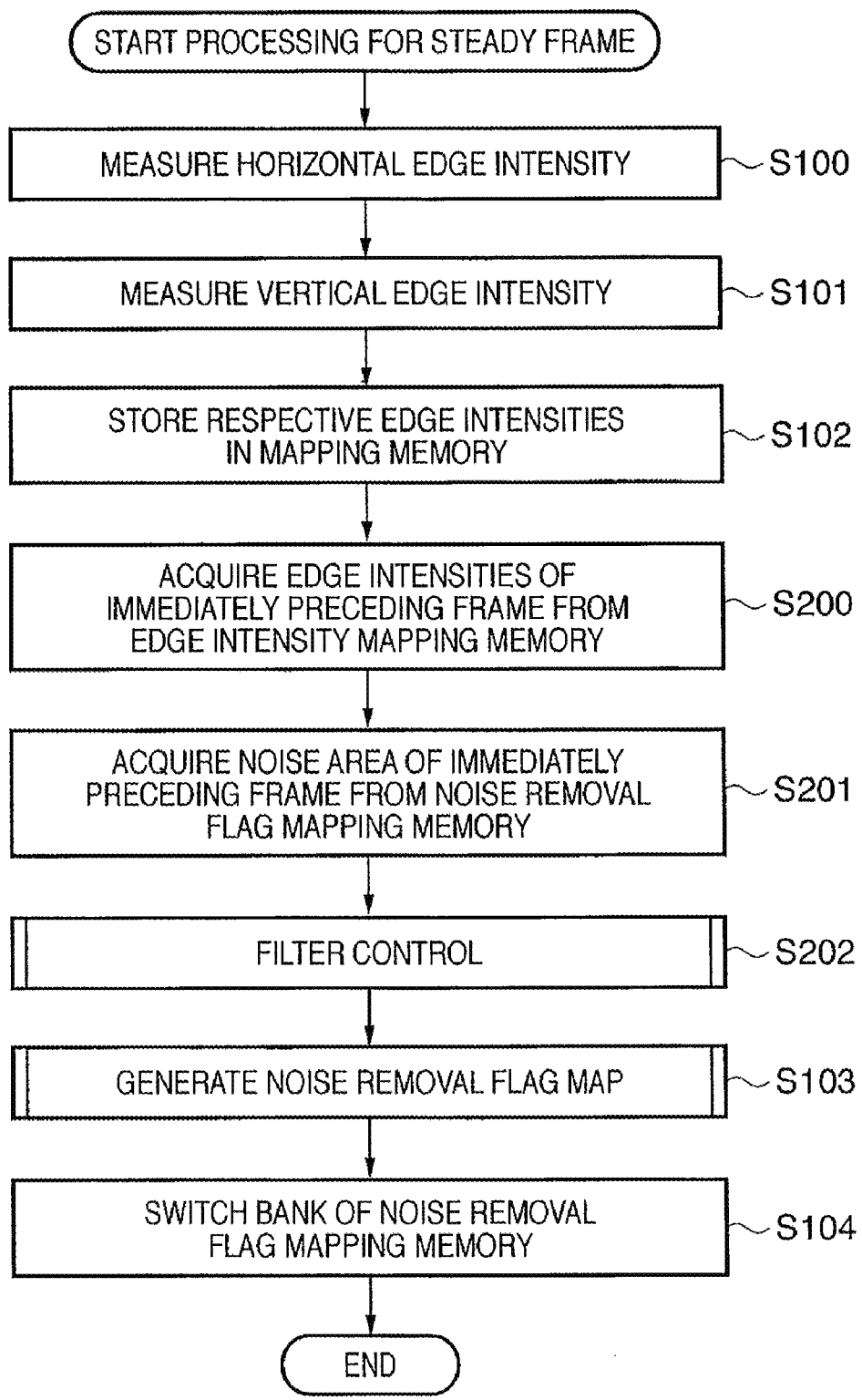
FIG. 3 is a flowchart explaining the processing of normal frames after the first frame in the image processing apparatus according to the first exemplary embodiment.

FIG. 3 is a flowchart for explaining the processing for frames after the first frame of the input image in the image processing apparatus according to this exemplary embodiment.

The processing for the first frame will be described first with reference to FIG. 2.

In step S100, the horizontal edge intensity measuring instrument 100 measures the horizontal edge intensity of a block (8×8 pixels) of input luminance signals of an image. Parallel to this step, in step S101 the vertical edge intensity measuring instrument 101 measures the vertical edge intensity of the block of the input luminance signals of the image. In step S102, the instruments 100 and 101 store the measured values (edge intensity data) in the edge intensity mapping memory 102. After the horizontal and vertical edge intensity data for the first frame of the image are stored in the edge intensity mapping memory 102, the banks of the edge intensity mapping memory 102 are switched, so as to allow the data stored in the edge intensity mapping memory 102 in step S102 to be read out.

The process then advances to step S103, and the noise removal flag calculator 103 generates a noise removal flag map by calculating noise removal flags based on the edge intensity data stored in the edge intensity mapping memory 102. This processing will be described in detail later with reference to the flowchart of FIG. 5. In step S104, the memory banks of the noise removal flag mapping memory 104 are switched. As a result, the edge intensity data and noise removal flags can be read out from the stored memory banks of the edge intensity mapping memory and noise removal flag mapping memory 104. In the processing for the next frame, the measured edge intensity data and calculated noise removal flags are to be stored in the memory banks on the other side of the corresponding memories.

With the above processing, for the first frame of the input image, only the storage processing of the edge intensity data and noise removal flags in the edge intensity mapping memory 102 and noise removal flag mapping memory 104 is executed, and filter control for noise removal is not executed.

The processing for frames after the first frame will be described below with reference to FIG. 3. For these frames, the processes in steps S200 to S202 are added to those (S100 to S104) for the first frame shown in FIG. 2. Therefore, these added steps S200 to S202 will be described below.

In step S102, the horizontal and vertical edge intensity measuring instruments 100 and 101 store the edge intensities of the current frame (other than the first frame) in the edge intensity mapping memory 102. The process then advances to step S200, and the filter controller 105 reads out the edge intensity data for each block of the immediately preceding frame, which are stored in the edge intensity mapping memory 102. In step S201, the filter controller 105 reads out the noise removal flag for each block (filtering block) of the immediately preceding frame, which is stored in the noise removal flag mapping memory 104. The process then advances to step S202, and the filter controller 105 generates the control signal 110 for the horizontal filter 106, the control signal 111 for the 2D filter 107, and the selection signal 112 for the selector 108, based on these edge intensity data and noise removal flags of the immediately preceding frame. The filter controller 105 executes noise removal filtering processing for a region to be filtered. The processing in step S202 will be described later with reference to the flowchart of FIG. 6. In step S103, the noise removal flag calculator 103 generates a noise removal flag map for the current frame based on the edge intensity data of the current frame stored in the edge intensity mapping memory 102. Since the subsequent processes are the same as those in FIG. 2, a description thereof will be omitted.

Figure 4A:
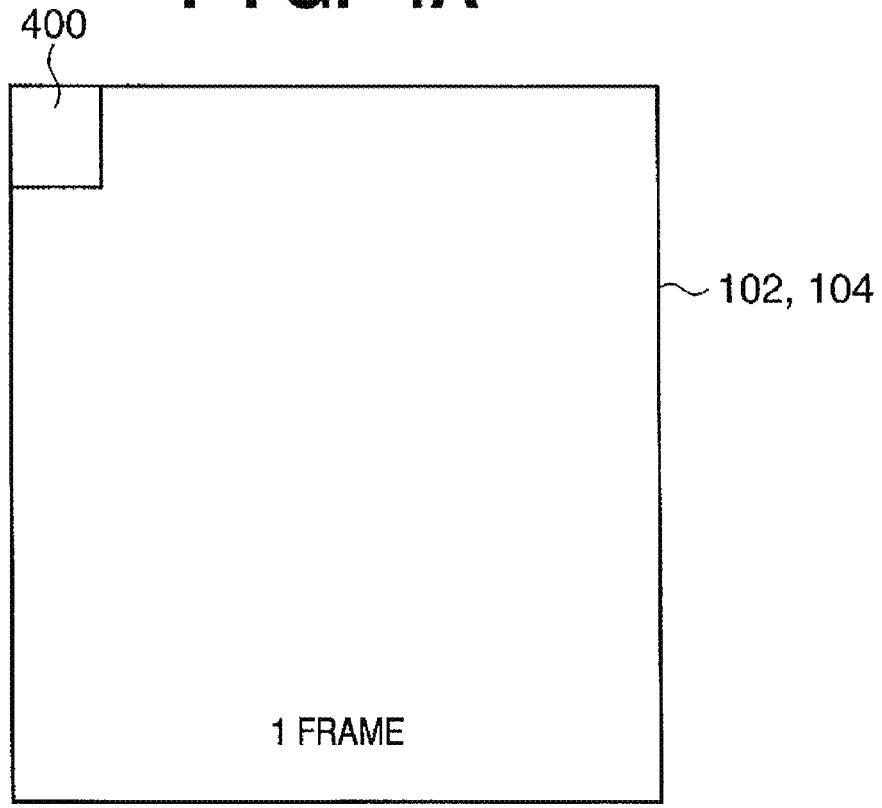
FIGS. 4A to 4C depict views for explaining the data configuration of an edge intensity mapping memory and noise removal flag mapping memory according to this exemplary embodiment.
Figure 4B:
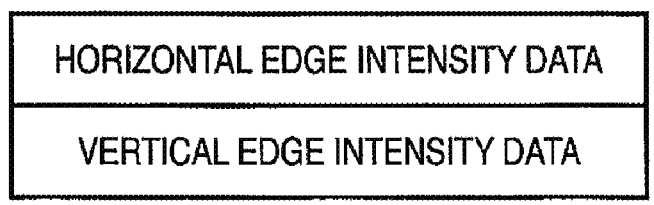
Figure 4C:
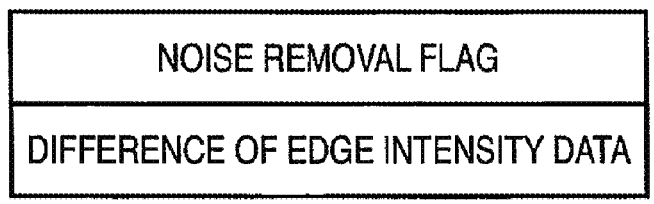

FIGS. 4A to 4C depict views explaining the data configuration of the edge intensity mapping memory 102 and noise removal flag mapping memory 104 according to this exemplary embodiment.

FIG. 4A shows a memory area for one frame of the edge intensity mapping memory 102 and the noise removal flag mapping memory 104, which stores intensity data or noise removal flags, and reference numeral 400 denotes a data area corresponding to one block. FIG. 4B shows the data configuration stored in the data area 400 of the edge intensity mapping memory 102. This area stores a pair of horizontal edge intensity data measured by the horizontal edge intensity measuring instrument 100, and vertical edge intensity data measured by the vertical edge intensity measuring instrument 101. FIG. 4C shows an area which stores a noise removal flag which is stored in the noise removal flag mapping memory 104 and indicates whether or not a block of interest is a filtering block, and a difference value between the edge intensity data of an expanded block (to be described later) and that of a block as an expansion source. Note that this difference value is stored for only the expanded block (to be described later).

Figure 5:
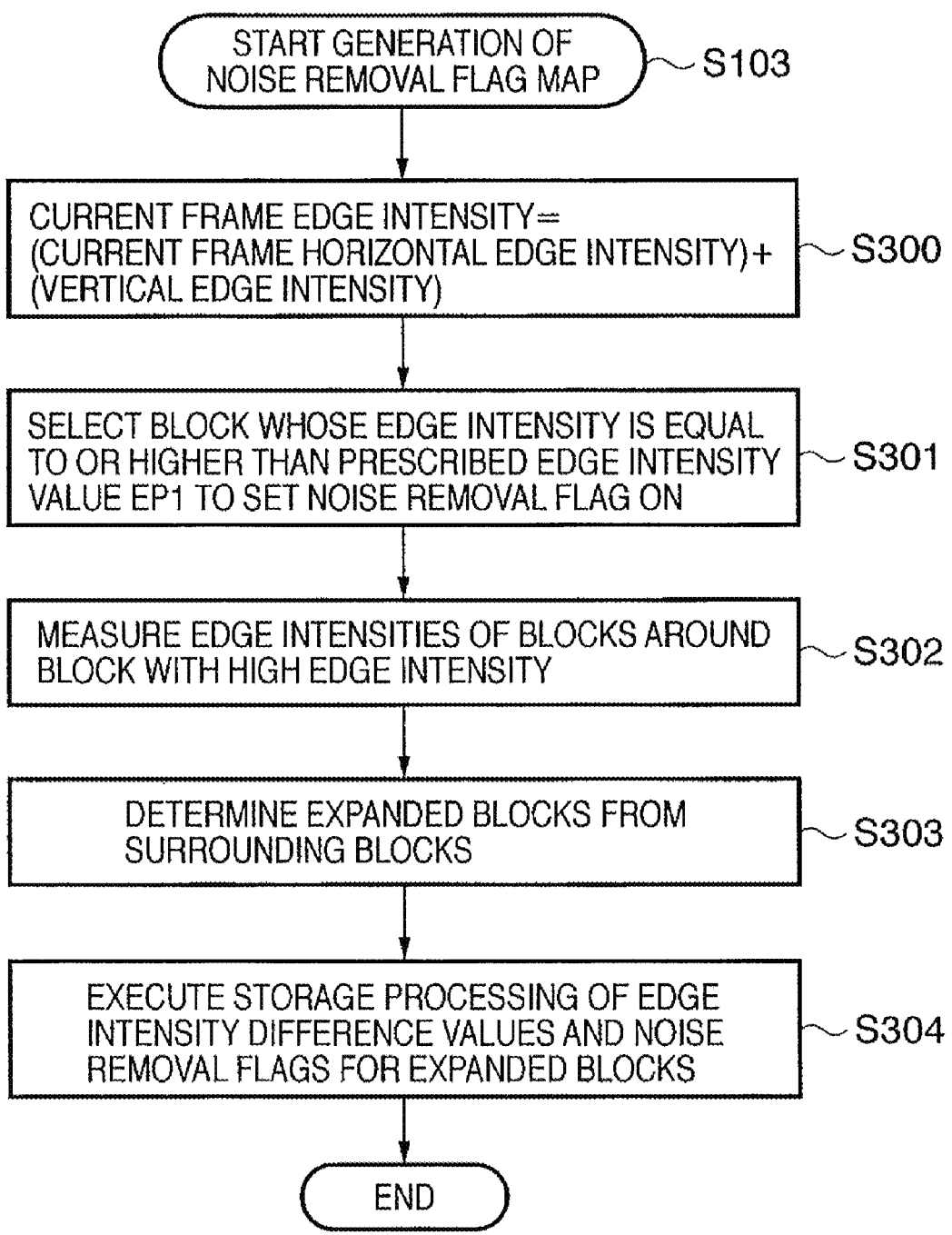
FIG. 5 is a flowchart explaining the generation processing of a noise removal flag map in step S103 in FIGS. 2 and 3.

FIG. 5 is a flowchart explaining the generation processing of the noise removal flag map in step S103 in FIGS. 2 and 3.

In step S300, the noise removal flag calculator 103 reads out the horizontal and vertical edge intensity data of each block of the current frame, which are stored in the edge intensity mapping memory 102, and adds these data. The calculator 103 defines the sum as edge intensity data for each block of the current frame. In step S301, the calculator 103 extracts a block of the current frame, which has an edge intensity being equal or higher than a threshold EP1 (larger edge intensity data) of the measured and stored edge intensity data of the respective blocks of the current frame. The calculator 103 sets ON the noise removal flag of a block in the noise removal flag mapping memory 104, which corresponds to the extracted block. In step S302, the calculator 103 calculates the edge intensities of eight blocks around (neighboring) the extracted block. In step S303, the calculator 103 obtains blocks whose edge intensities are equal or lower than a threshold EP2 (EP2<EP1) (smaller edge intensity data), and determines these blocks as an expanded block including the block with the high edge intensity extracted in step S301. In step S304, the calculator 103 sets ON a noise removal flag for the expanded block obtained by this processing, and stores OFF noise removal flags for other blocks in the noise removal flag mapping memory 104. For the expanded block, the calculator 103 stores a difference value between the edge intensity data (whose edge intensity is low (<EP2)) of the expanded block and that of the block (whose edge intensity is high (≧EP1)).

Figure 6:
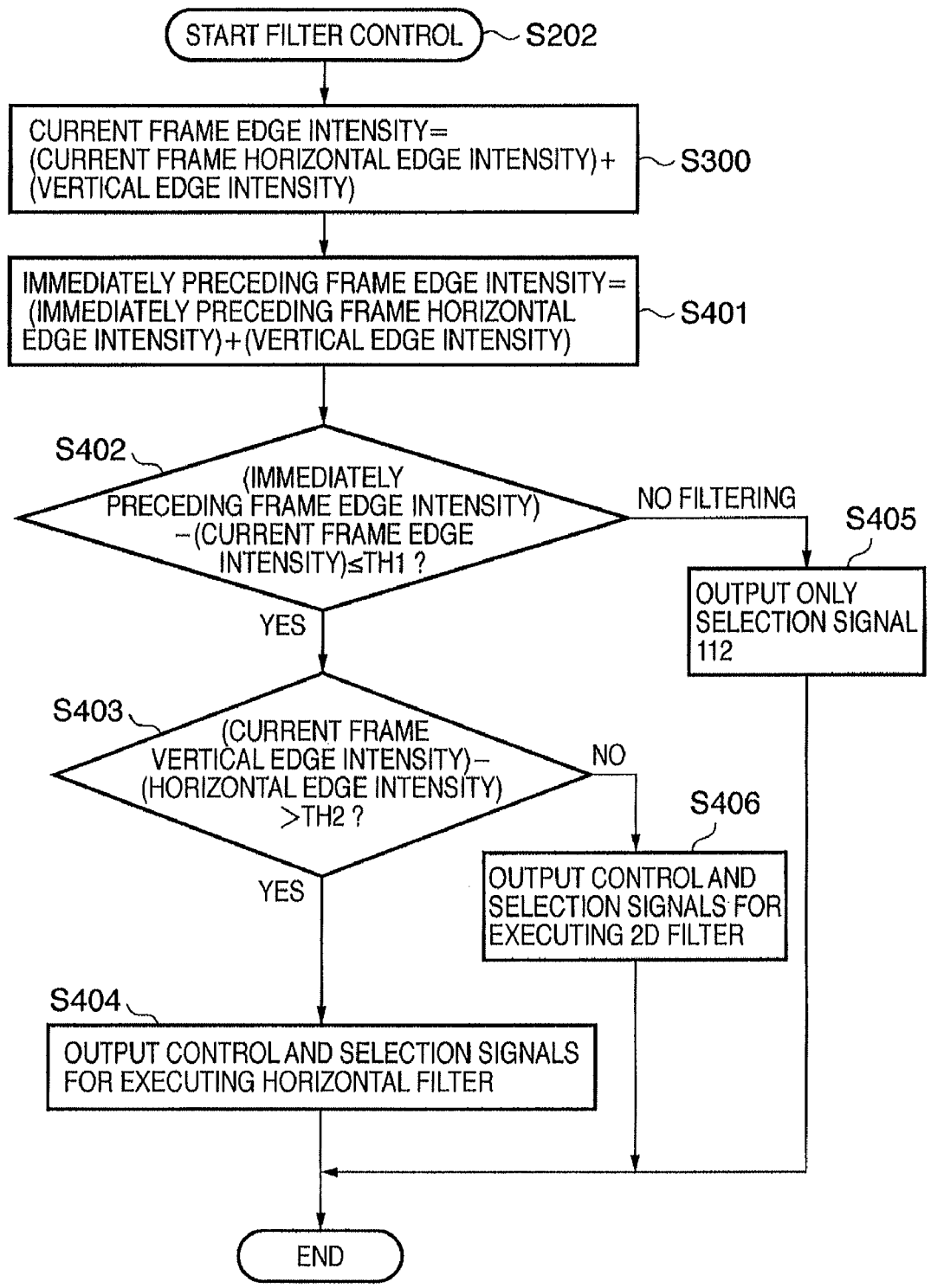
FIG. 6 is a flowchart explaining the filter control processing in step S202 in the flowchart of FIG. 3.

FIG. 6 is a flowchart for explaining the filter control processing (generation processing of the control signals 110 and 111 and selection signal 112) in step S202 of the flowchart in FIG. 3. A block to be processed in this processing is a block which is determined to have an ON noise removal flag in step S201 above.

In step S300, the filter controller 105 adds the horizontal and vertical edge intensity data of each block of the current frame, which are stored in the edge intensity mapping memory 102, so as to calculate the edge intensity data of that block of the current frame, as in step S300 in FIG. 5. In step S401, the controller 105 reads out the horizontal and vertical edge intensity data of the corresponding block of the immediately preceding frame, which are stored in the other memory bank of the edge intensity mapping memory 102, and adds these data to calculate the edge intensity data of that block of the immediately preceding frame. The process then advances to step S402, and the controller 105 calculates a difference for each block between the edge intensity data of the block of the current frame calculated in step S300 and that of the block of the immediately preceding frame calculated in step S401. As a result, the controller 105 determines if the absolute value of the difference value {(edge intensity data of immediately preceding frame)−(edge intensity data of current frame)} is equal to or smaller than a threshold TH1. If the difference value is equal to or smaller than the threshold TH1, the controller 105 determines that the block is a filtering block, and the process advances to step S403. Otherwise, the controller 105 determines that the block does not require any filtering processing, and the process advances to step S405. In step S405, the controller 105 controls the selector 108 to select and output the block of the input image using the selection signal 112 (to skip the filtering processing). Note that this threshold TH1 is used to exclude filtering processing for a block which includes a horizontal edge and/or a vertical edge but includes, e.g., a fine mesh.

In the process of step S403 for the block which is determined as the filtering block in step S402, the filter controller 105 subtracts the horizontal edge intensity data from the vertical edge intensity data of that block of the current frame, and determines if the difference value is equal to or smaller than a threshold TH2, so as to select the type of filter. If the difference value is equal to or smaller than the threshold TH2 (TH2<TH1), since the edge intensity difference between the horizontal and vertical directions is small, the process advances to step S406, and the controller 105 outputs the control signal 111 for executing the 2D filter 107, and the selection signal 112 for selecting an output of the 2D filter 107. On the other hand, if the difference value is larger than the threshold TH2 in step S403, since the vertical edge is stronger, the process advances to step S404, and the controller 105 outputs the control signal 110 for executing the horizontal filter 106 and the selection signal 112 for selecting an output of the horizontal filter 106. This threshold TH2 is a value used to exclude filtering processing for noise in the horizontal direction, which is unique to interlaced data.

In this way, in step S202 (FIG. 3), the horizontal filter 106 and 2D filter 107 execute filtering processing at an intensity based on the edge intensity difference value, and the selector 108 selects and outputs the filtering result.

FIG. 7 depicts a view explaining a practical expansion example of the edge area of the immediately preceding frame, and an example of the processes until filtering blocks of the current frame are determined. Note that in FIG. 7, each grid corresponds to the aforementioned block.

In an immediately preceding frame 700, blocks 710 which have edge intensity data larger than the threshold EP1 are selected (S301 in FIG. 5). An area configured by these blocks 710 is expanded towards blocks 711 which have extremely small edge intensity data equal to or smaller than the threshold EP2 (determined in S303). These blocks are determined as filtering blocks in the subsequent processes. In the example of FIG. 7, blocks 712 indicated by the bold line in the immediately preceding frame 700 form the expanded area.

The difference value between the edge intensity data of each block of the immediately preceding frame 700 and that of the block of a current frame 701 is calculated. If the difference value is equal to or smaller than the threshold TH1 (S402), that block is determined as a filtering block. On the other hand, if the difference value is larger than the threshold TH1, that is, the edge intensity is high, that block is excluded from filtering blocks (S405).

In the example of FIG. 7, blocks 714 indicated by the bold line in the current frame 701 of the blocks 712 included in the expanded area are excluded from filtering blocks since they have higher noise intensities in the current frame. Therefore, in the example of FIG. 7, the blocks 712 are finally determined as filtering blocks.

Figure 10:
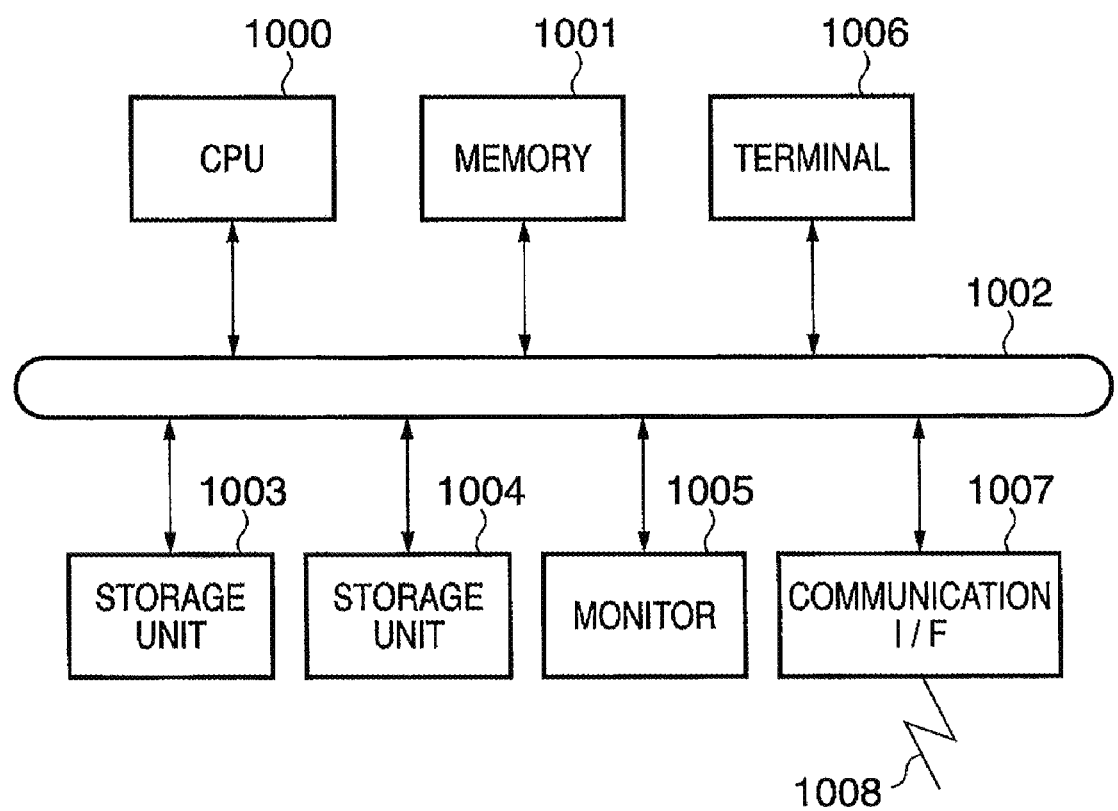
FIG. 10 is a block diagram showing the hardware arrangement of a computer which implements the image processing apparatus according to an exemplary embodiment of the present invention.

FIG. 10 is a block diagram showing the hardware arrangement of a computer which implements the image processing apparatus according to the exemplary embodiment of the present invention.

A CPU 1000 controls the overall computer (image processing apparatus), and executes various processes. A memory 1001 stores an operating system (OS), software (programs for implementing the aforementioned flowcharts), and data required to control this computer, and provides a storage area required for processes such as arithmetic operations and the like. This memory 1001 is also used as a work area when the CPU 1000 executes various processes. A system bus 1002 connects the CPU 1000 and respective units to exchange data and control signals. A storage unit 1003 comprises, for example, a large-capacity hard disk or the like, which stores various kinds of software such as the programs of the aforementioned flowcharts and the like. A storage unit 1004 is a storage unit (hard disk, MO, CD, DVD, or the like) which stores moving image data. A monitor (display unit) 1005 displays images, system messages from the computer, and the like.

A communication interface (I/F) 1007 is a communication interface which transmits encoded data to a communication line 1008, and is connected to a LAN, public line, wireless line, broadcasting wave, or the like outside the apparatus. A terminal 1006 is used to start up this computer and to set various conditions. The memory 1001 is assured with an area which stores software such as an OS for controlling the overall computer and activating various kinds of software, and software to be activated, and loads image data, and a working area which stores parameters of various arithmetic operations and the like.

In the above arrangement, prior to the processing, the user instructs to start up this computer using the terminal 1006 by selecting moving image data to be encoded from those stored in the storage unit 1004. In response to this instruction, a program stored in the storage unit 1003 is developed on a program storage area of the memory 1001 via the system bus 1002, and the developed program is launched.

When the CPU 1000 starts coding processing of moving image data stored in the storage unit 1004, program codes according to the flowcharts shown in FIGS. 2, 3, 5, 6, and 12 are executed.

As described above, the computer according to this embodiment functions as the apparatus for implementing noise removal according to the first embodiment and to the second to fourth embodiments to be described later.

Other Arrangements of First Embodiment

In the first embodiment, the size of a block to be processed is defined by 4×4 pixels, but other sizes such as 8×4, 4×8, 8×8, and the like may be used.

The processes of the edge intensity measuring instruments 100 and 101 use the Sobel filters shown in FIGS. 8A and 8B, but other differential filters may be used.

The horizontal filter 106 and 2D filter 107 use the operators shown in FIGS. 9A and 9B, but may use other operators.

Furthermore, the frame memory stores a frame image. Alternatively, a field memory which stores a field image may be used.

The thresholds EP1 and EP2 in the noise removal flag calculator 103 need not be fixed but may be variably set for respective frames.

As described above, according to the first embodiment, in a moving image coding apparatus and method thereof including an interlaced signal, a part in image data where coding noise such as mosquito noise is generated can be adequately detected. Since the horizontal filter and 2D filter are adaptively switched, noise removal processing can be applied while maintaining the state of the interlaced signal.

Second Embodiment

Figure 11:
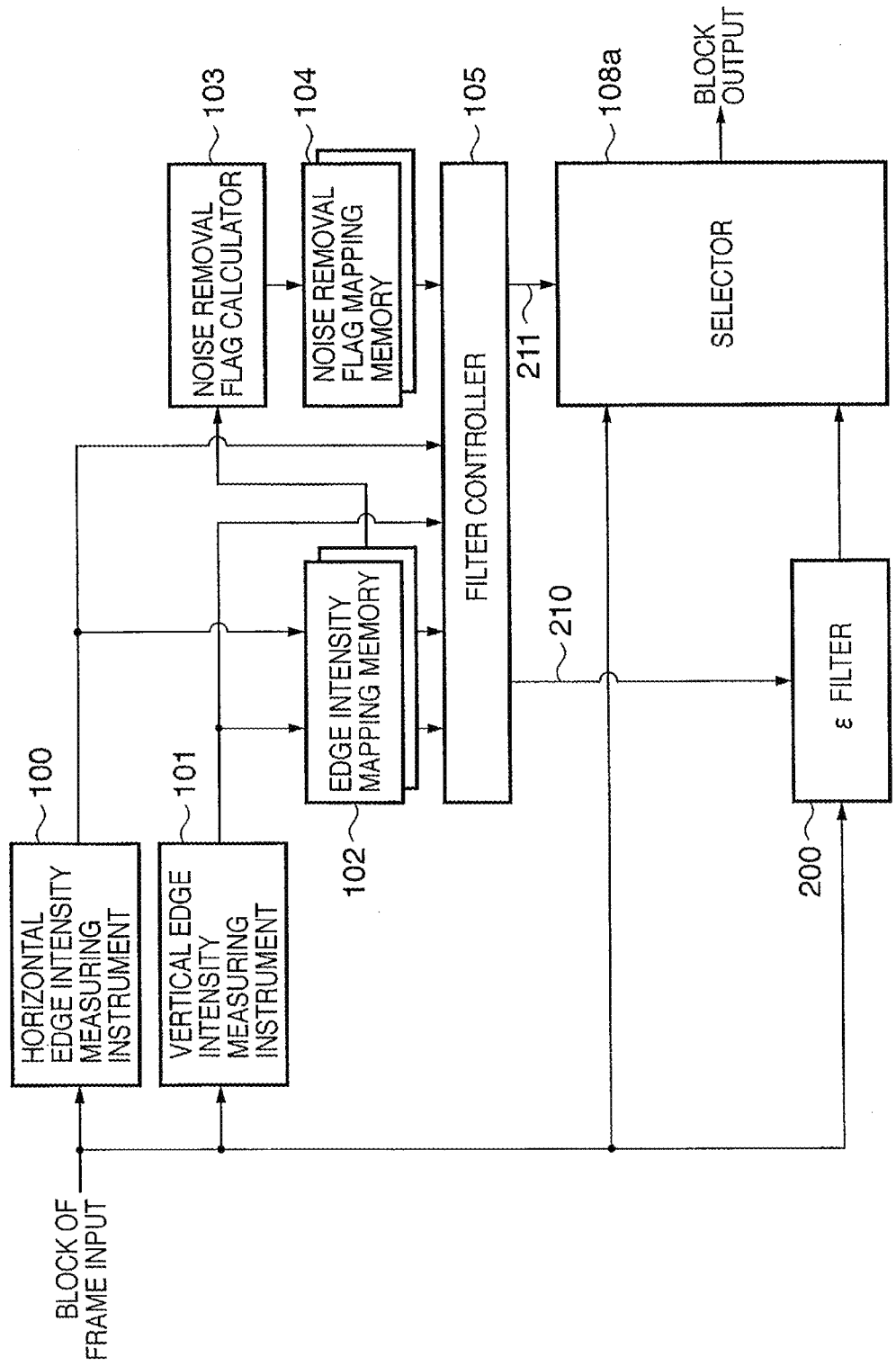
FIG. 11 is a block diagram showing the arrangement of principal part of an image processing apparatus according to a second exemplary embodiment of the present invention.

FIG. 11 is a block diagram showing the arrangement of principal part of an image processing apparatus according to the second embodiment of the present invention. The second embodiment defines a control unit of image data as a block of 4×4 pixels, which is called an object block. Note that the same reference numerals in FIG. 11 denote the same components as those in FIG. 1 according to the aforementioned first embodiment, and a repetitive description thereof will be avoided.

An $\epsilon$ filter 200 executes $\epsilon$ filter processing in response to a control signal 210 from the filter controller 105.

FIG. 13 depicts a view explaining this $\epsilon$ filter processing.

This filter processing calculates difference values between a pixel value f(x, y) of a central pixel and pixel values f(x+i, y+j) (i, j=−M, . . . , 0, 1, . . . , M) of its neighboring pixels. If the absolute value of the difference value is larger than $\epsilon$, the pixel values of the neighboring pixels are replaced by that of the central pixel to implement smoothing processing. As a result, g(x, y) given by an equation shown in FIG. 13 can protect edge components and can smooth and suppress higher harmonics of small amplitudes as noise. Note that M is a value which specifies the pixel range of the $\epsilon$ filter, and is normally "1" or "2" ("1" in the second embodiment). Also, $\epsilon 0$ is a value which specifies the range of filter values (levels to be smoothed), $\epsilon 0$ assumes a value smaller than the level difference of preserved edges, and is normally "10" or less and "5" in the second embodiment. Please refer to reference 1 below for details of this $\epsilon$filter processing.
(Reference 1: Hiroshi Harashima et. al., "$\epsilon$-separating non-linear digital filter and its application", The Institute of Electronics, Information and Communication Engineers, Sho57-Ron146 [A-36], April 1982)

A selector 108a selects an output of the $\epsilon$ filter 200 or a non-filter signal (color difference signals of an input block) in response to a selection signal 211 from the filter controller 105.

The operation of the apparatus according to the second exemplary embodiment is nearly the same as that of the first exemplary embodiment. Therefore, the control method of the $\epsilon$ filter 200 and selector 108a as a different part will be described below with reference to the flowchart of FIG. 12.

Figure 12:
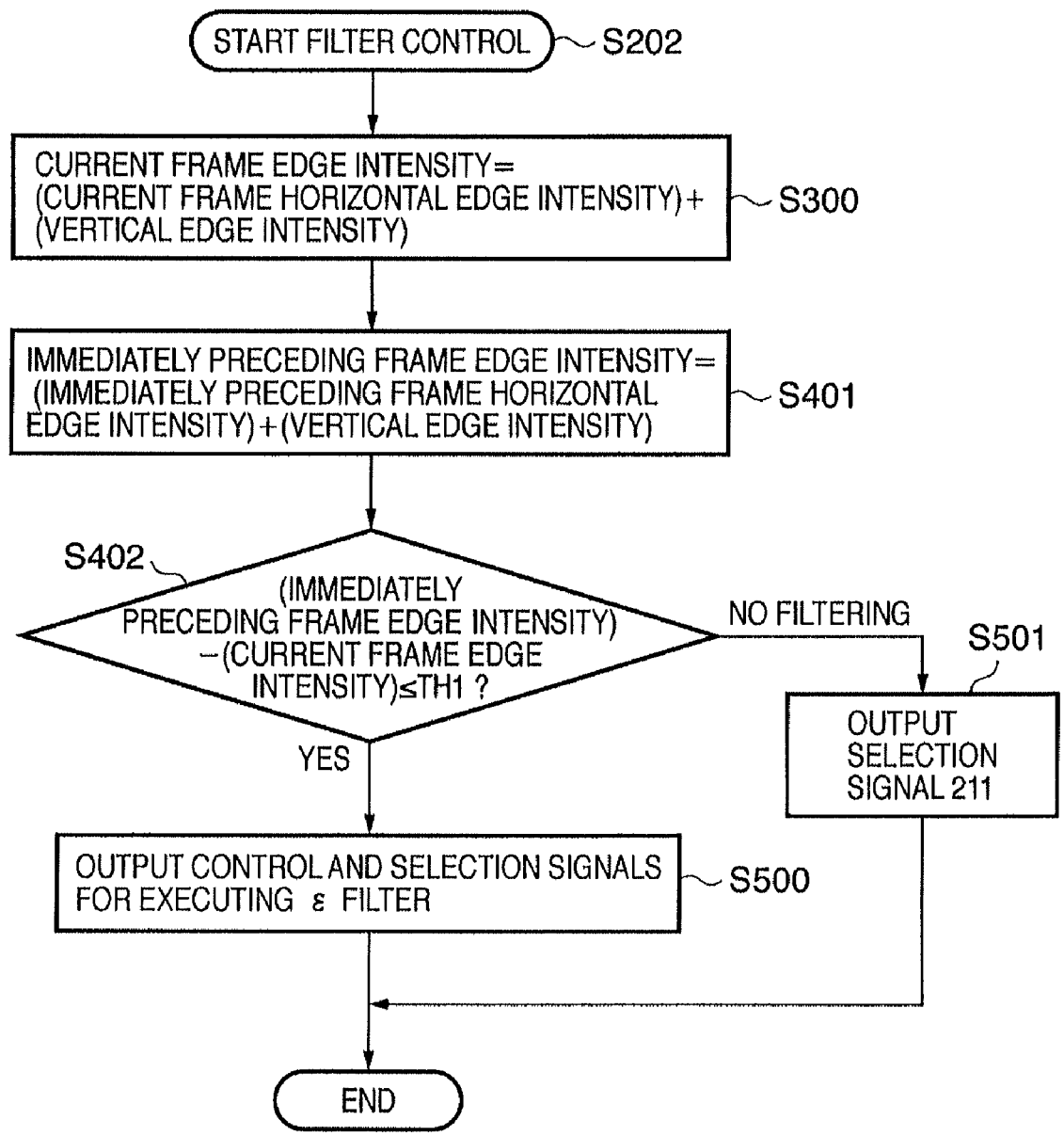
FIG. 12 is a flowchart explaining the filter control processing in step S202 of the flowchart shown in FIG. 3 according to the second exemplary embodiment.

FIG. 12 is a flowchart explaining the filter control processing (generation processing of the control signal 210 and selection signal 211) according to the second exemplary embodiment, corresponding to step S202 of the flowchart of FIG. 3. Note that the same step numbers in FIG. 12 denote the steps common to FIG. 6 above. An object to be processed in this processing is a block with an ON noise removal flag described above.

In step S300, the filter controller 105 reads out horizontal and vertical edge intensity data of each block of the current frame, which are stored in the edge intensity mapping memory 102, and adds them to calculate edge intensity data for each block of the current frame. In step S401, the controller 105 reads out the horizontal and vertical edge intensity data of the corresponding block of the immediately preceding frame, which are stored in the edge intensity mapping memory 102, and adds them to calculate edge intensity data for that block of the immediately preceding frame. In addition, in step S401, the controller 105 reads out the horizontal and vertical edge intensity data of the corresponding block of the immediately preceding frame, which are stored in the other memory bank of the edge intensity mapping memory 102, and adds them to calculate edge intensity data for that block of the immediately preceding frame.

In step S402, the filter controller 105 calculates a difference value {(edge intensity data of a block in the immediately preceding frame)−(edge intensity data of a block in the current frame)} between the calculated edge intensity data for each block of the immediately preceding frame and that for the corresponding block of the current frame. It is determined in step S402 by the controller 105 that the block having the difference value equal to or smaller than the threshold TH1, the controller 105 determines that the block is a filtering block, then the process advances to step S500. In step S500, the controller 105 generates the control signal 210 used to control the $\epsilon$ filter 200 to execute filter processing. Then, the controller 105 generates the selection signal 211 to switch the selector 108a to select an output of the $\epsilon$ filter 200 and output the output from the $\epsilon$ filter 200. If it is determined in step S402 that the difference value is not equal to or smaller than the threshold TH1, the process advances to step S501, and the controller 105 generates the selection signal 211 to switch the selector 108a to select and output image data of the input block.

In the exemplary second embodiment, since the practical expansion example of the edge area of the immediately preceding frame and the processes until the filtering block of the current frame is determined are the same as those in the first exemplary embodiment, a repetitive description thereof will be avoided.

Other Arrangements of Second Embodiment

In the exemplary second embodiment, the size of a block to be processed is defined by 4×4 pixels, but other sizes such as 8×4, 4×8, 8×8, and the like may be used.

The processes of the edge intensity measuring instruments 100 and 101 use the Sobel filters shown in FIGS. 8A and 8B, but other differential filters may be used.

In place of the ε filter, other edge preservation filters may be used.

The frame memory stores a frame image. Alternatively, a field memory which stores a field image may be used.

The thresholds EP1 and EP2 in the noise removal flag calculator 103 may not be fixed but may be variably set for respective frames.

As described above, according to the second exemplary embodiment, in a moving image coding apparatus and method thereof including an interlaced signal, a part in image data where coding noise such as mosquito noise is generated can be adequately detected. Since the edge preservation filter is used, noise removal processing can be applied while maintaining the state of the interlaced signal.

Third Embodiment

Figure 14:
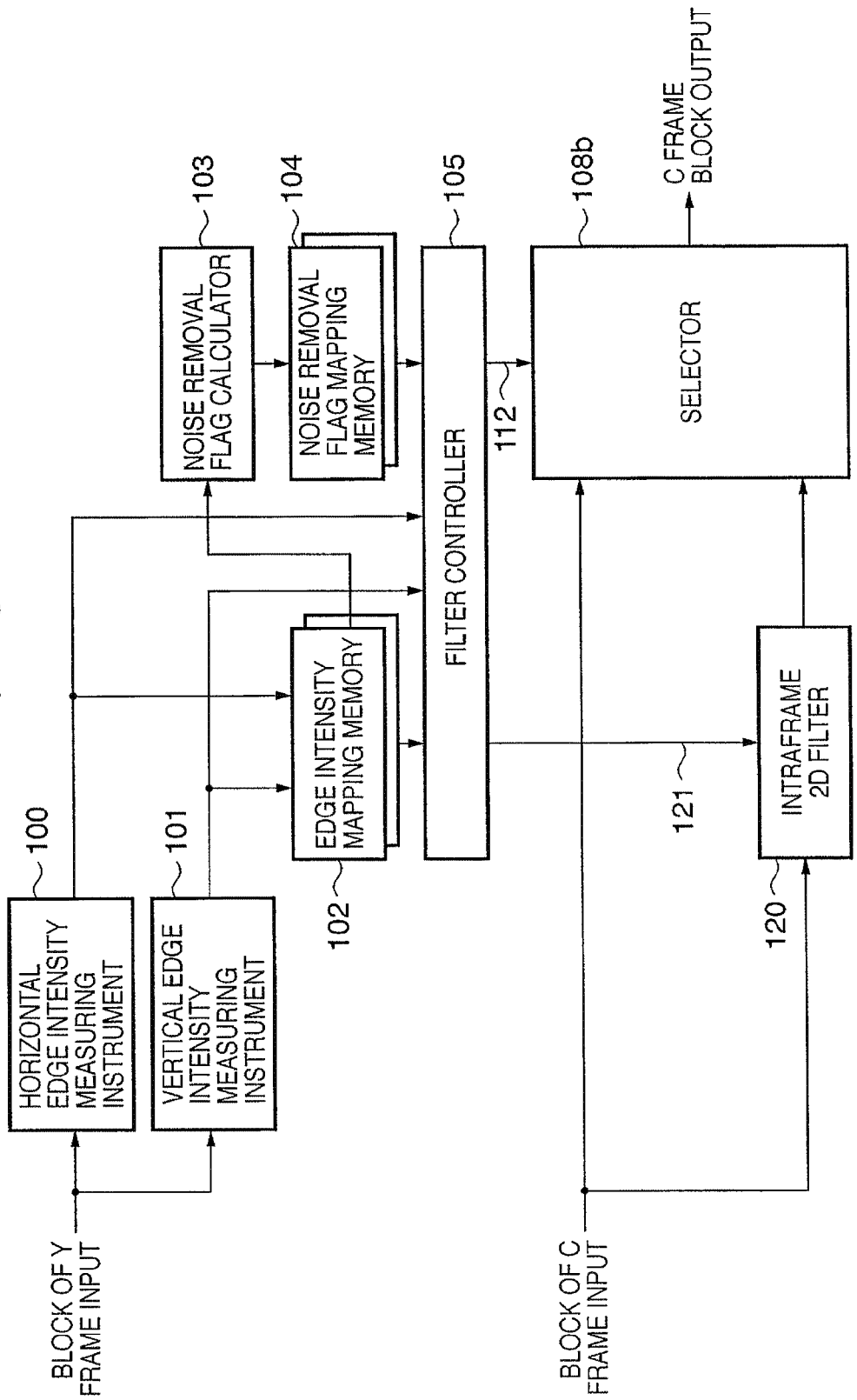
FIG. 14 is a block diagram showing the arrangement of principal part of an image processing apparatus according to a third exemplary embodiment of the present invention.

FIG. 14 is a block diagram showing the arrangement of principal part of an image processing apparatus according to a third exemplary embodiment of the present invention. Note that in the third embodiment an 8×8 pixel size of luminance signals of an image and a 4×4 pixel size of color difference signals thereof are defined as units of processing of image data, which are called object blocks.

Referring to FIG. 14, a horizontal edge intensity measuring instrument 100 receives one block of luminance signals of an image, and measures the horizontal edge intensity of that block. A vertical edge intensity measuring instrument 101 receives one block of luminance signals of that image, and measures the vertical edge intensity of that block. This embodiment expresses the edge intensity for pixels of a block as the processing unit by an accumulated value of a Sobel filter. Operators of Sobel filters used in the third embodiment are the same as those in FIGS. 8A and 8B.

An edge intensity mapping memory (edge intensity storage unit) 102 receives horizontal and vertical edge intensity data measured by the horizontal and vertical edge intensity measuring instruments 100 and 101, and stores the horizontal and vertical edge intensity data for respective blocks for one frame. Note that this edge intensity mapping memory 102 has a 2-bank configuration, so that the edge intensity data of current frame can be stored in one memory bank while the stored edge intensity data of the immediately preceding frame can be read out from the other memory bank. The memory banks are switched for the processing of each frame. A noise removal flag calculator 103 calculates a noise removal flag (specifying information) indicating if a block of interest is a filtering block, based on the edge intensity data for respective blocks stored in the edge intensity mapping memory 102. A noise removal flag mapping memory 104 stores noise removal flags, calculated by the noise removal flag calculator 103, for respective blocks only for one frame. Note that the noise removal flag mapping memory 104 also has a 2-bank configuration, so that the noise removal flags can be stored in one memory bank, while the stored noise removal flags of the immediately preceding frame can be read out from the other memory bank. The memory banks are switched for the processing of each frame.

A filter controller 105 controls whether or not to apply a 2D filter 120 (to be described later), based on the horizontal and vertical edge intensity data for each block of the current frame, and the edge intensity data and the noise removal flag of the corresponding block of the immediately preceding frame. Note that the horizontal and vertical edge intensity data of each block of the current frame are the results measured by the horizontal and vertical edge intensity measuring instruments 100 and 101, respectively. The edge intensity data of each block of the immediately preceding frame are read out from the edge intensity mapping memory 102, and the noise removal flag for each block of the immediately preceding frame is read out from the noise removal flag mapping memory 104.

The 2D filter 120 receives a block of color difference signals to be processed and executes intraframe two-dimensional (to be abbreviated as 2D hereinafter) filter processing in response to a control signal 121 from the filter controller 105.

Note that the third embodiment uses an ε filter as the 2D filter 120.

This ε filter processing is expressed by the equations shown in FIG. 13 above.

A selector 108b selects an output of the 2D filter 120 or a non-filter signal (color difference signals of an input block) in response to a selection signal 112 from the filter controller 105.

The operations for generating the horizontal and vertical edge intensity data and the generation processing of the noise removal flag map in the apparatus with the above arrangement are the same as those of the flowcharts shown in FIGS. 2, 3, and 5.

Figure 16:
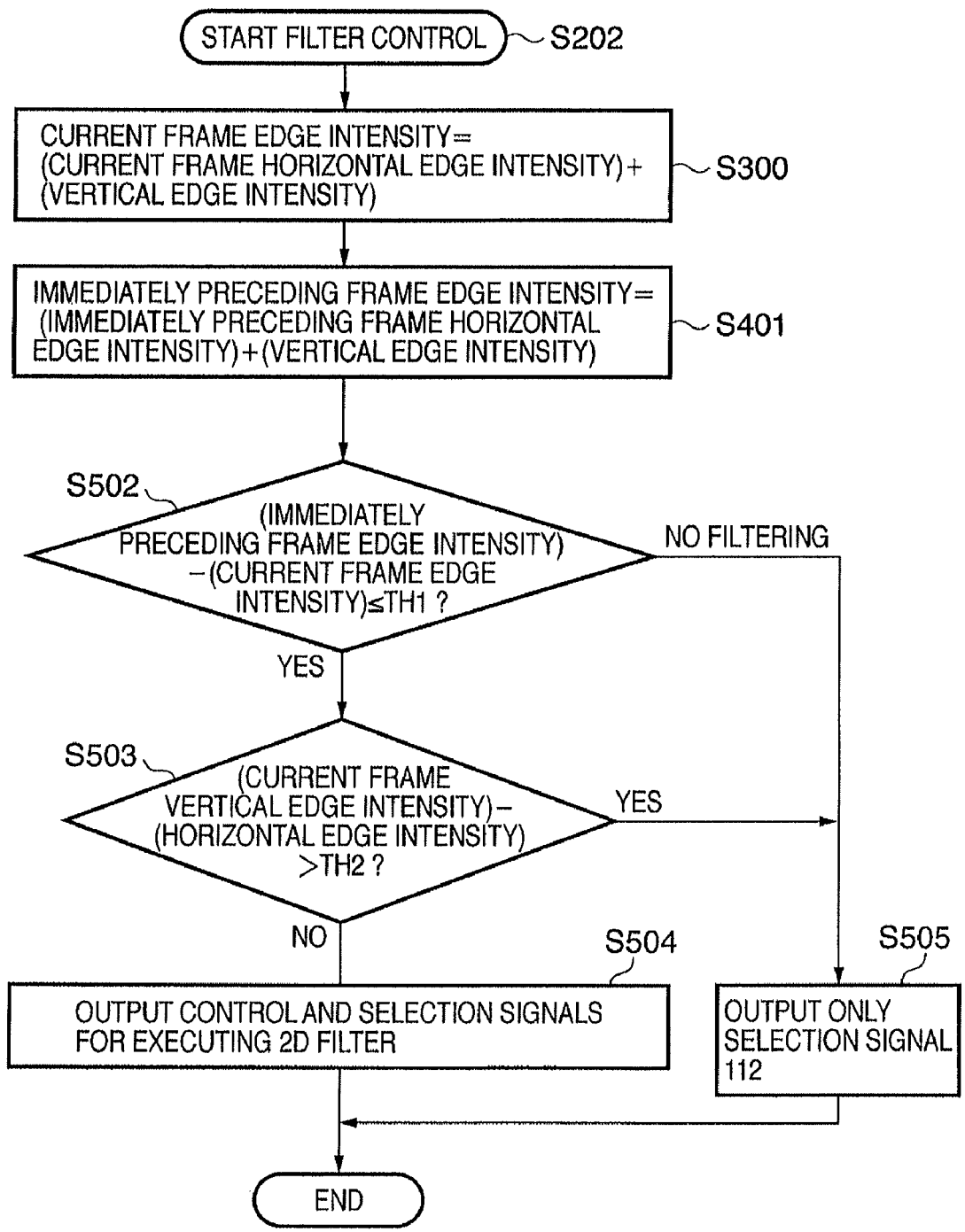
FIG. 16 is a flowchart explaining the filter control processing in step S202 of the flowchart shown in FIG. 3 according to the third exemplary embodiment of the present invention.

FIG. 16 is a flowchart explaining the filter control processing (generation processing of the control signal 121 and selection signal 112) according to the third embodiment, corresponding to step S202 of the flowchart of FIG. 3. Note that the same step numbers in FIG. 16 denote the steps common to FIG. 5 above. An object to be processed in this processing is a block with an ON noise removal flag described above, In step S300, the filter controller 105 adds horizontal and vertical edge intensity data of each block of the current frame, which are stored in the edge intensity mapping memory 102 to calculate edge intensity data for each block of the current frame, as in step S300 of FIG. 5, described above. In step S401, the controller 105 reads out the horizontal and vertical edge intensity data of the corresponding block of the immediately preceding frame, which are stored in the other memory bank of the edge intensity mapping memory 102, and adds them to calculate edge intensity data for that block of the immediately preceding frame. The process advances to step S502 to calculate a difference between the edge intensity data for each block of the current frame calculated in step S300 and that for the corresponding block of the immediately preceding frame calculated in step S401. As a result, the controller 105 determines if the absolute value of the difference value {(edge intensity data of immediately preceding frame)−(edge intensity data of current frame)} is equal to or smaller than a threshold TH1. If it is determined in step S502 that the absolute value is equal to or smaller than the threshold TH1, the controller 105 determines that the block is a filtering block, and the process advances to step S503; otherwise, the controller 105 determines that no filter processing is required, and the process advances to step S505. In step S505, the controller 105 controls the selector 108b to output a block of the input image intact using the selection signal 112. Note that this threshold TH1 is used to exclude filtering processing for a block which includes a horizontal edge and/or a vertical edge but includes, e.g., a fine mesh.

In step S300, the filter controller 105 adds horizontal and vertical edge intensity data of each block of the current frame, which are stored in the edge intensity mapping memory 102 to calculate edge intensity data for each block of the current frame, as in step S300 of FIG. 5 described above. In step S501, the controller 105 reads out the horizontal and vertical edge intensity data of the corresponding block of the immediately preceding frame, which are stored in the other memory bank of the edge intensity mapping memory 102, and adds them to calculate edge intensity data for that block of the immediately preceding frame. The process advances to step S502 to calculate a difference between the edge intensity data for each block of the current frame calculated in step S300 and that for the corresponding block of the immediately preceding frame calculated in step S501. As a result, the controller 105 determines if the absolute value of the difference value {(edge intensity data of immediately preceding frame)−(edge intensity data of current frame)} is equal to or smaller than a threshold TH1. If it is determined in step S502 that the absolute value is equal to or smaller than the threshold TH1, the controller 105 determines that the block is a filtering block, and the process advances to step S503; otherwise, the controller 105 determines that no filter processing is required, and the process advances to step S505. In step S505, the controller 105 controls the selector 108b to output a block of the input image intact using the selection signal 112. Note that this threshold TH1 is used to exclude filtering processing for a block which includes a horizontal edge and/or a vertical edge but includes, e.g., a fine mesh.

In the process of step S503 for the filtering block, the filter controller 105 subtracts the horizontal edge intensity data from the vertical edge intensity data of that block of the current frame, and it is determined if the difference value is equal to or smaller than a threshold TH2. If the difference value is equal to or smaller than the threshold TH2 (TH2<TH1), since the edge intensity difference between the horizontal and vertical directions is small, the process advances to step S504, and the controller 105 generates the control signal 121 for executing the 2D filter 120; otherwise, since the vertical edge is stronger, the process advances to step S505, and the controller 105 generates the selection signal 112 to control the selector 108b to select an image signal of the input block while skipping the filter process of the 2D filter 120. This threshold TH2 is a value used to exclude filtering processing for noise in the horizontal direction, which is unique to interlaced data.

Figure 15:
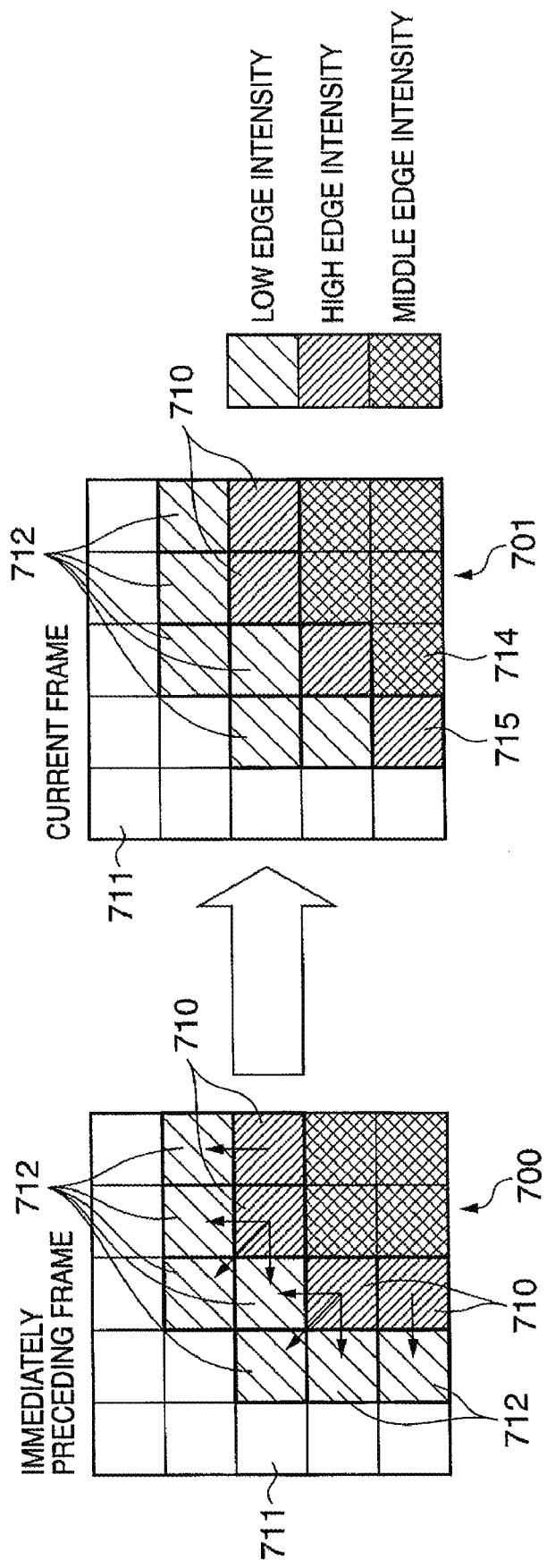
FIG. 15 depicts a view explaining an expansion example of an edge area of an immediately preceding frame, and a practical example until a filtering block of the current frame is determined according to the third exemplary embodiment.

FIG. 15 depicts a view explaining a practical expansion example of the edge area of the immediately preceding frame, and an example of the processes until filtering blocks of the current frame are determined. Note that in FIG. 15, each grid corresponds to the aforementioned block.

In an immediately preceding frame 700, blocks 710 which have edge intensity data larger than the threshold EP1 are selected (S301). An area configured by these blocks 710 is expanded towards blocks 711 which have extremely small edge intensity data equal to or smaller than the threshold EP2 (S303). These blocks are determined as filtering blocks in the subsequent processes (S304). In the example of FIG. 15, blocks 712 indicated by the bold line in the immediately preceding frame 700 form the expanded area (expanded blocks).

The difference value between the edge intensity data of each block of the immediately preceding frame 700 and that of the block of a current frame 701 is calculated. If the difference value is equal to or smaller than the threshold TH1 (S502) or if the edge intensity data of the block of the current frame 701 becomes equal to or larger than the threshold EP1 (S301), that block is determined to form a filtering block area. Otherwise, that block is excluded from filtering blocks. In the current frame 701 of FIG. 15, reference numeral 714 denotes a block which is excluded from filtering blocks since it has the edge intensity data equal to or smaller than the threshold EP1 in the current frame 701. Also, reference numeral 715 denotes a block which is changed from an expanded block to a filtering block since its edge intensity data becomes equal to or larger than the threshold EP1.

As described above, according to the third embodiment, a part in image data where coding noise such as mosquito noise is generated can be adequately detected. Also, noise removal processing can be applied to only the noise containing part (filtering block) while holding texture data of an original image.

Other Embodiments

The embodiments of the present invention have been explained in detail. The present invention may be applied to either a system constituted by a plurality of devices, or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a home page on the Internet using a browser on a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, a user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted in or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-014199 and 2007-014200 filed Jan. 24, 2007, which are hereby incorporated by reference herein in their entirety.

What is claimed is:

1. An image processing apparatus comprising:
a measuring unit configured to acquire edge intensity information by dividing a frame of an image into a plurality of blocks and measuring an edge of an image in each block;
a storage unit configured to store the edge intensity information of respective blocks for at least one frame;
a determination unit configured to determine a block to be filtered based on the edge intensity information of the respective blocks stored in the storage unit; and
a control unit configured to determine whether or not to apply filtering processing to a first block, which is determined by the determination unit as the block to be filtered, of a current frame of an image based on the edge intensity information of the first block in the current frame acquired by the measuring unit, and edge intensity information of a second block corresponding to the first block in an immediately preceding frame of the current frame, which is stored in the storage unit,
wherein the control unit calculates an edge intensity for each block of the immediately preceding frame by adding the edge intensity information stored in the storage unit for each block, calculates an edge intensity for each block of the current frame by adding the edge intensity information of the current frame measured by the measuring unit for each block, and determines whether or not to apply the filtering processing to the first block of the current frame of the image, based on the edge intensities of the second block of the immediately preceding frame and the first block of the current frame.

2. The apparatus according to claim 1, further comprising a filtering unit configured to apply filtering processing to the first block which is determined by the control unit to apply the filtering processing.

3. The apparatus according to claim 1, wherein the determination unit calculates an edge intensity for each block by adding the edge intensity information stored in the storage unit for each block, and determines specifying information used to specify a third block which has the calculated edge intensity larger than a first threshold and a block which neighbors the third block and has an edge intensity smaller than the edge intensity of the third block by not less than a second threshold being less than the first threshold.

4. The apparatus according to claim 1, wherein the storage unit is configured by a plurality of memory banks, which are switched for image processing of each frame.

5. The apparatus according to claim 1, wherein the measuring unit measures a horizontal edge and a vertical edge of the block.

6. An image processing apparatus comprising:
a measuring unit configured to acquire edge intensity information by dividing a frame of an image into a plurality of blocks and measuring an edge of an image in each block; and
a control unit configured to determine whether or not to apply filtering processing to each block of the current frame of an image, based on the edge intensity information of each block of the current frame acquired by the measuring unit, and the edge intensity information of a corresponding block of an immediately preceding frame of the current frame,
wherein the control unit calculates an edge intensity for each block of the immediately preceding frame by adding the edge intensity information for each block, calculates an edge intensity for each block of the current frame by adding the edge intensity information of the current frame for each block, and determines whether or not to apply the filtering processing to a first block of the current frame of the image, based on the edge intensities of a second block corresponding to the first block in the immediately preceding frame and the first block of the current frame.

7. An image processing method comprising the steps of:
acquiring edge intensity information by dividing a frame of an image into a plurality of blocks and measuring an edge of an image in each block;
storing, in a memory, the edge intensity information of respective blocks for at least one frame;
determining a block to be filtered based on the edge intensity information of the respective blocks stored in the memory; and
determining whether or not to apply filtering processing to a first block, which is determined in the determining step as the block to be filtered, of a current frame of an image, based on the edge intensity information of the first block in the current frame acquired in the acquiring step and edge intensity information of a second block corresponding to the first block in an immediately preceding frame of the current frame, which is stored in the memory,
wherein the determining step comprising:
calculating an edge intensity for each block of the immediately preceding frame by adding the edge intensity information stored in the storing step for each block; and
calculating an edge intensity for each block of the current frame by adding the edge intensity information of the current frame acquired in the acquiring step for each block,
wherein the determining step determines whether or not to apply the filtering processing to the first block of the current frame of the image, based on the edge intensities of the second block of the immediately preceding frame and the first block of the current frame.

8. A non-transitory computer-readable storage medium storing a program for making a computer execute an image processing method according to claim 7.

* * * * *